G. O. BURWELL AND C. M. KURTZ.
TROLLEY WHEEL MOUNT.
APPLICATION FILED SEPT. 29, 1921.
1,415,987.
Patented May 16, 1922.
Fig. 1.
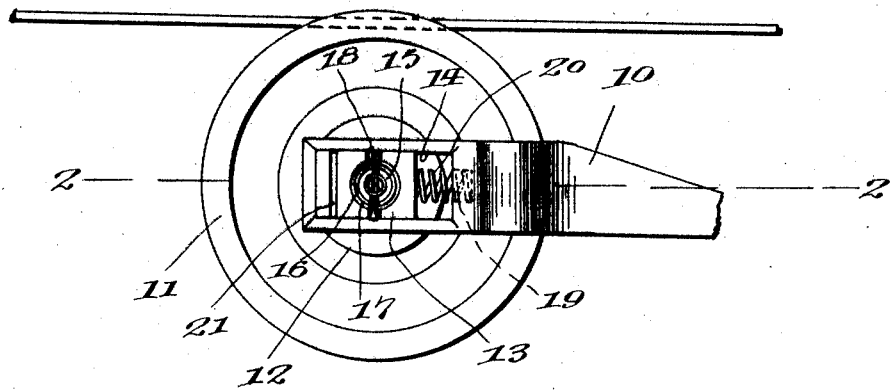
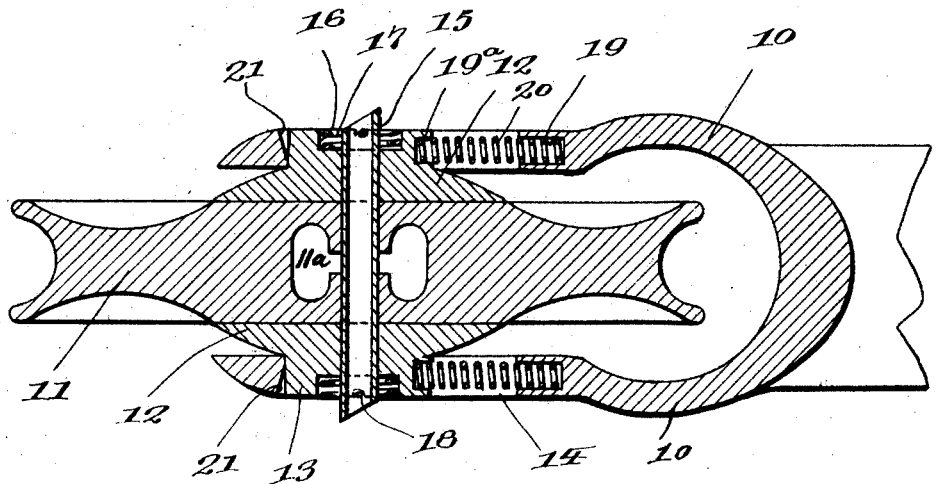
Fig. 2.
Inventors:
George O. Burwell.
Charles M. Kurtz.
By Milo B. Stevens Co,
Attorneys.

UNITED STATES PATENT OFFICE.

GEORGE O. BURWELL, OF DETROIT, MICHIGAN, AND CHARLES M. KURTZ, OF BELLEVUE, PENNSYLVANIA.

TROLLEY-WHEEL MOUNT.

1,415,987.   Specification of Letters Patent.   Patented May 16, 1922.

Application filed September 29, 1921. Serial No. 504,044.

*To all whom it may concern:*

Be it known that we, GEORGE O. BURWELL and CHARLES M. KURTZ, citizens of the United States, residing at Detroit, county of Wayne, State of Michigan, and at Bellevue, in the county of Allegheny and State of Pennsylvania, respectively, have invented new and useful Improvements in Trolley-Wheel Mounts, of which the following is a specification.

This invention relates to mounts or supports for trolley-wheels, shoes or other current collectors, and its object is to provide a novel and improved support which allows the collector to freely adapt itself to curves and switches so that it will not slip off the wire.

The invention also has for its object to provide a novel and improved bearing for the collector which enables the same to be readily assembled, and which assures a positive electrical contact.

A further object of the invention is to provide a novel and improved means for cooling the device, an air-cooled axle being provided.

Other objects and advantages of the invention will be pointed out in the detailed description appearing hereinafter, and in order that the invention may be better understood, reference is had to the accompanying drawing forming a part of this specification.

In the drawing,

Figure 1 is a side elevation of the invention, and

Fig. 2 is an enlarged horizontal section on the line 2—2 of Fig. 1.

Referring specifically to the drawing 10 denotes the two laterally spaced branches of a trolley harp between which the wheel 11 or other current collector is mounted.

On each side of the wheel 11 is located a contact shoe 12 which is separate from the wheel and has a central outstanding bearing member 13. The trolley harp branches 10 have longitudinal slots 14 which are horizontal and run in the direction of travel of the wheel. The bearing members 13 seat slidably in the slots 14 and they are of squared cross section, with the slots correspondingly shaped, to prevent rotation, and to form a positive electrical connection.

The bearing members 13 have central transverse openings to seat an axle 15 which also passes through the wheel 11, the latter running loose thereon.

The outer ends of the bearing members 13 have recesses 16 which seat springs 17 coiled around the axle 15. The springs 17 are held on the axle 15 by cotter pins or other suitable abutments 18 passed through the latter. The springs 17 tend to force the bearing members 13 inwardly or in the direction of the wheel 11, with the result that the contact shoes 12 are firmly pressed against the sides of the wheel to maintain a positive electrical contact at all times.

The inner faces of the shoes 12 are flat or otherwise shaped to fit the sides of the wheel 11, and their outer faces are made semi-spherical or substantially so.

As the bearing members 13 are slidable in the slots 14, the wheel 11 is left free to swing transversely, whereby it is caused to automatically adjust itself to the wire on a curve and follow the wire, the inner faces of the harp branches 10 being spaced from the outer rounded portions of the shoes 12 so as not to interfere with this movement. In one of the end walls of the slots 14 is a recess 19 in which seats a coiled spring 20 which bears against the member 13 and normally holds it against the opposite end wall of the slot. The member 13 has a side recess 19ᵃ to seat the spring. The last-mentioned end wall is beveled part-way, as shown at 21, to allow a more free play of the bearing member 13. The springs 20 yield either way when the bearing members 13 shift in the slots 14, and when the wheel 11 again reaches the straight portion of the wire, the springs restore the parts to their normal position.

The invention is readily applicable to standard or specially designed trolley shoes and wheels, the contact shoes being constructed accordingly.

The hub of the wheel 11 is hollow, as shown at 11ᵃ, to form an oil container with a recess completely around the center to allow oil to reach and lubricate the necessary parts.

An air-cooled axle 15 is provided, the same being hollow to form an air-passageway opening through both ends of the axle, as shown in Fig. 2. It will also be noted that the ends of the axle are beveled, this being for the purpose of promoting a positive flow of air through the axle. The bevels face in opposite directions, so that one beveled end always faces in the direction the wheel 11 is traveling, this end being the one which scoops up the air and forces it through the axle. The axle is therefore air-cooled, and overheating of the parts associated therewith is effectually prevented. The axle is also strong and light, and is stationary, it being so held by the ends of the cotter pins 18 seating in recesses in the outer ends of the members 13 as shown in Fig. 1.

The preferred embodiment of the invention has been shown, but it will be understood that various changes and modifications may be made without a departure from the spirit and scope of the invention as claimed hereinafter.

We claim:

1. The combination of a support having branches, a current collector between the branches, contact shoes engaging the sides of the collector and having outstanding bearing members carried by the aforesaid branches, and recessed at their outer ends, an axle supporting the collector, said axle being carried by the bearing members and extending into the end recesses thereof, springs engageable with the bearing members for maintaining a contact between the shoes and the collector, said springs seating in the aforesaid recesses, and abutments on the axles against which the springs bear at one end.

2. The combination with a current collector, of an axle on which said collector is mounted, said axle being hollow to provide an air-passageway extending from one end to the other, the ends of said axle being beveled in opposite directions.

In testimony whereof we affix our signatures.

GEORGE O. BURWELL.
CHARLES M. KURTZ.